United States Patent [19]

Thiel

[11] Patent Number: 4,719,067

[45] Date of Patent: Jan. 12, 1988

[54] METHOD AND APPARATUS FOR FORMING END PIECES ON PLASTIC MOLDING STRIPS

[75] Inventor: Manfred Thiel, Hagen, Fed. Rep. of Germany

[73] Assignee: Gebr. Happich GmbH, Fed. Rep. of Germany

[21] Appl. No.: 738,012

[22] Filed: May 24, 1985

[30] Foreign Application Priority Data

Jun. 5, 1984 [DE] Fed. Rep. of Germany ....... 3420848

[51] Int. Cl.⁴ .............................................. B29C 45/00
[52] U.S. Cl. .................................... 264/259; 264/139; 264/328.1
[58] Field of Search ............ 264/259, 138, 139, 328.1; 425/129 R, 116

[56] References Cited

U.S. PATENT DOCUMENTS 4,619,847 10/1986 Jackson ........................... 264/259 X

FOREIGN PATENT DOCUMENTS

| 0022735 | 2/1984 | Japan | 264/138 |
| 0031932 | 2/1985 | Japan | 264/259 |
| 0031933 | 2/1985 | Japan | 264/259 |
| 2054449 | 2/1981 | United Kingdom | 264/259 |

Primary Examiner—Jan H. Silbaugh
Assistant Examiner—Leo B. Tentoni
Attorney, Agent, or Firm—Ostrolenk, Faber, Gerb & Soffen

[57] ABSTRACT

A method of forming end pieces on plastic molding strips which have at least one longitudinally external hollow chamber within. The end pieces are formed by injection molding on the ends of the molding strip in a mold which receives the end regions of the molding strip. The end of the strip is seated against a capping element located in the molding cavity. The capping element serves both as a stopper which fixes the axial position of the strip within the molding cavity and as a capping element which seals the opening into the hollow chamber of the strip.

3 Claims, 4 Drawing Figures

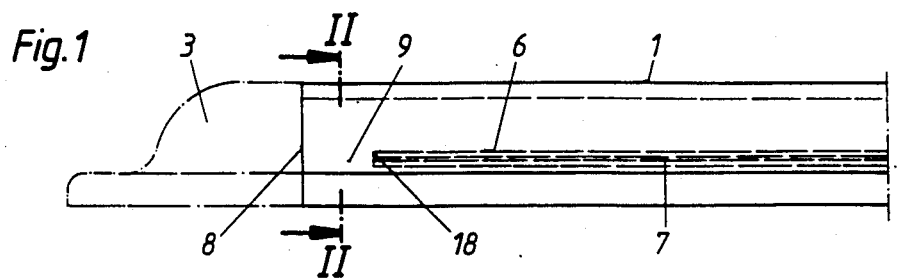
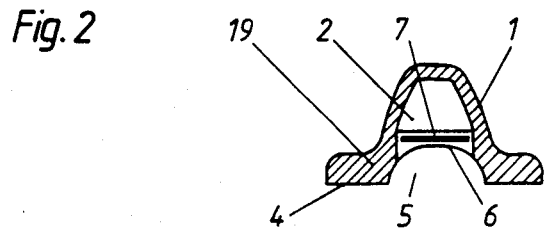
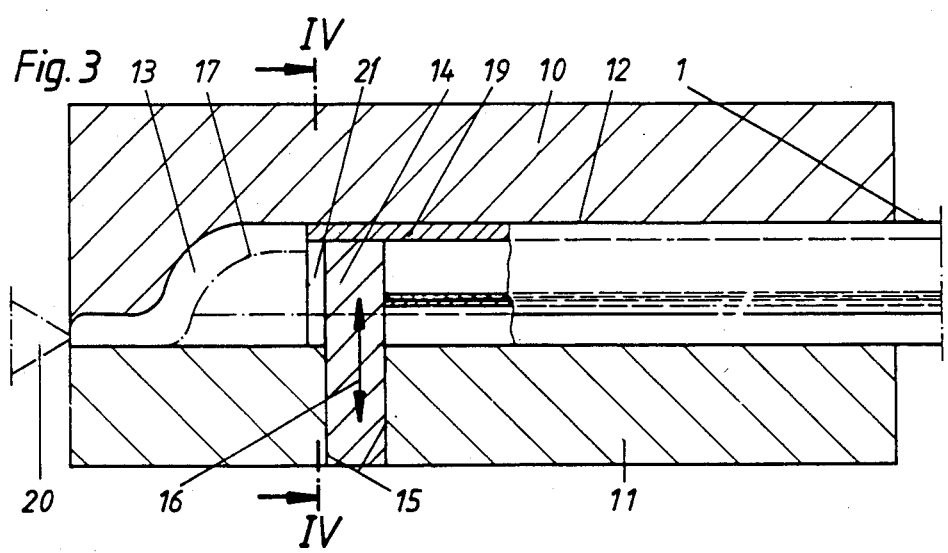
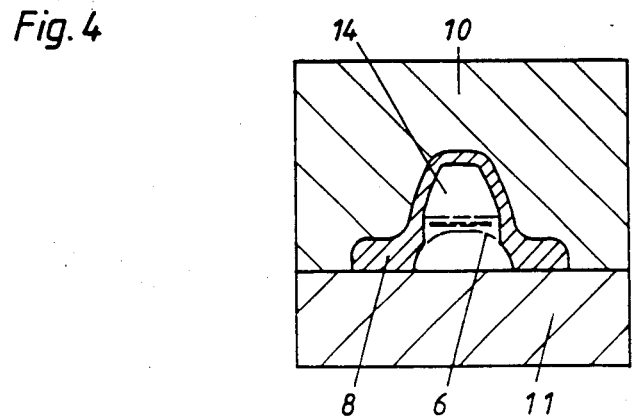

METHOD AND APPARATUS FOR FORMING END PIECES ON PLASTIC MOLDING STRIPS

BACKGROUND OF THE INVENTION

The present invention relates to a method of forming end pieces on plastic molding strips. The molding strips have at least one hollow chamber which extends lengthwise in the molding. The end pieces are formed, by injection molding, on the ends of the molding strip in a plastic injection mold which is shaped to receive the end regions of the molding strips. The openings into the hollow chamber of the strip is covered in the mold to prevent molding compound for entering into the chamber.

The invention furthermore relates to an apparatus for carrying out the method of the invention. The apparatus includes an injection mold having two mold halves between which there is defined a clamping space for receiving and clamping an end of the molding strip and a mold cavity into which molding compound is injected to mold an end piece onto a free end of the strip.

Plastic molding strips are used frequently in connection with vehicles. They can have ornamental and protective functions. Plastic molding strips are produced by extrusion and are generally provided at both ends with a respective end piece. This is particularly the case in the molding strips to which the present invention relates and which is characterized by its hollow chamber which extends in the longitudinal direction of the molding.

It is known, for instance, from Federal Republic of Germany Application DE-OS No. 17 55 596 and DE-OS No. 19 50 412 to produce end pieces separately by injection molding and to thereafter attach them to the molding strips by bonding, welding, clipping, bolting, etc. The foregoing method is, however, very expensive because of the additional production steps and, further, its appearance is not optimal because of visible separation seams. Federal Republic of Germany Application DE-OS No. 17 55 596 suggests the possibility of injecting end pieces directly on the end of the molding strips. However, the suggestion is made with respect to solid molding strips not having a continuous hollow chamber within. The method could not be used universally because pressurized molding compound would enter the strip.

To overcome this problem, plugs having end collars are produced in a separate injection molding process. The plugs are inserted into the ends of the hollow chamber of the molding strips and then the actual end pieces are injection molded onto the ends of the molding strips within an injection mold which receives the end regions of the molding strips. This manufacturing method is disadvantageous in several respects. First, a separate manufacture and mounting of the plugs is required resulting in added costs. Furthermore, the collar of the plugs which rests against the end of the molding strip is not sufficiently supported, particularly if the molding strip is made with a relatively thin wall. Moreover, the presence of the collar reduces the contact surface between the ends of the molding strip and the end pieces, resulting in a poor connection. Another significant disadvantage of the conventional method is that the full injection pressure acts both on the plug and on the end surface region of the molding strip when end pieces are formed by injection molding. The injection pressure must, however, be kept within a very limited range in view of the fact that axial displacement of the molding strips during the injection process is not permitted and further because the hollow molding strip cannot be clamped in position with a large force. This means that the end pieces do not assume the surface structure of the mold cavity so that the gloss or finish of the molding strip and the end pieces differ. The end pieces are generally shinier than the duller looking molding strips, which is undesirable.

SUMMARY OF THE INVENTION

It is in an object of the present invention, therefore, to provide a method of forming end pieces on plastic molding strips which have at least one lengthwise, extending hollow chamber. The end pieces and strips are to have a uniform, improved surface finish which is producable relatively economically.

It is another object of the invention to provide an apparatus for the carrying out the method of the present invention.

In accordance with the invention, the open ends of the molding strips are pushed into the injection mold until the ends abut a capping element, arranged in the injection mold, which serves to cover the chamber within the strip. Then the end pieces are formed by injection molding.

Advantageously, therefore, the separate manufacture and assembly of plugs is avoided, resulting in cost savings. Furthermore, due to the capping element, the injection pressure no longer acts on the entire cross-section of the molding strip. Consequently, although the clamping force on the molding strips is maintained at previous levels, the injection pressure can be increased. The higher injection pressure produces an improvement in quality.

In a preferred embodiment, the end of the strip, at the openings into the hollow chamber, is laterally cut out to fit around the capping element which is likewise shaped. Thus, improved capping of the hollow chamber is obtained.

The strip is so cut out that the strip extends over the capping element as the strip is pushed into the mold, the capping element fitting in the manner of a plug over the hollow chamber and in the cut-out. After the end piece is formed, the molding strip is simply lifted off the capping element.

In a further improvement of the above embodiment, the cut-out extends axially along the bottom of the molding strip so that the seat for the capping element is displaced slightly inwardly with respect to the end of the strip. Thus, a portion of the strip extends past the capping element resulting in a larger contact surface between the end pieces and the molding strip.

It is preferable to press the wall of the strip which encloses the hollow chamber against the capping element before formation of the end piece begins. In this way, it is possible to exert a relatively large clamping force on the molding strip to axially secure it in place. This permits even higher injection pressures and attendant improvements in quality in the surface finish of the end pieces.

An apparatus adapted for carrying out the method of the invention includes a mold which defines a clamping hollow space and a mold cavity in which is arranged a mold core piece. The mold core piece is both a stop for the end of the strip and also the capping element for the hollow chamber of the molding strip. The mold core piece preferably has a cross-section which permits it to fit at the opening into the hollow chamber at the end of the molding strip and to complement a cut-out region defined therein.

Other features and advantages of the present invention will be apparent from the following description of preferred embodiment and the accompanying drawings.

BRIEF DESCRIPTION OF THE DRAWINGS

FIG. 1 shows a molding strip with an end piece thereon, indicated by dash-dot lines.

FIG. 2 is a section along the line II—II of FIG. 1.

FIG. 3 is a longitudinal section through an injection mold.

FIG. 4 is a section along the line IV—IV of FIG. 3.

DETAILED DESCRIPTION OF A PREFERRED EMBODIMENT

FIGS. 1 and 2 show a plastic molding strip 1 including a hollow chamber 2 extending longitudinally through the molding. End pieces 3 are formed on the molding strip 1 by injection molding. Only one end piece 3 is shown in FIG. 1. It is indicated by dash-dot lines. The other end piece (not shown) is formed on the other end of the molding strip 3.

As shown in cross-section in FIG. 2, the bottom 4 of the molding strip 1 comprises a centrally located groove 5 which extends longitudinally along the molding. Between the groove 5 and the hollow chamber 2 is a web 6 which encloses the hollow chamber 2 and separates it from the bottom 4 of the strip. Along the bottom or longitudinally through the web 6 extends strip 7 constructed of steel, or the like. A cut-out region 9 is defined at each end region of the web 6 and strip 7. The cut-out region 9 commences at the end 8 of the strip 7 and extends in the axial direction of the molding strip, the lateral dimension of the cut-out being at least as wide as the chamber 2.

The injection mold illustrated in FIGS. 3 and 4 includes an upper mold half 10 and a lower mold half 11. The mold halves 10 and 11 define a clamping space 12 and a mold cavity 13. A mold core piece 14 is positioned between the clamping hollow space 12 and the mold cavity 13. The mold core piece 14 can be an integral component of the lower mold half 11. On the other hand, it may be slidably movable within lower mold half 11 along the lines 15 in the directions of the double-ended arrow 16. The mold core piece 14 may also include a core extension 17, as indicated by the dash-dot line which defines the shape of a hollow space in the end piece 3.

To form the end piece 3 on the molding strip 1, the strip is pushed into the clamping space 12 of the injection mold until the cut-out end 18 of the web 6 abuts against the mold core piece 14. Because the mold core piece 14 is shaped generally like the cut-out 9, it also serves as a capping element for the hollow chamber 2. Preferably, the mold core piece 14 fits precisely in the molding strip opening formed by the hollow chamber 2 and the cut-out region 9. Then, upon closing of the mold halves 10 and 11, the clamping force on the mold strip 1 presses the wall 19 of the strip against the mold core piece 14. This action hermetically closes off the opening into the strip.

Subsequently, an injection molding compound is injected through the injection mold entrance 20 into the mold cavity 13. Relatively high injection pressures are used and, using conventional techniques, the molding compound fuses homogeneously around the end 8 of the mold strip 1 and an end piece 3 is formed.

As shown in FIG. 3, the core piece 14 is displaced axially inwardly from the extreme free end 8 of the strip, whereby the end piece 3 adheres to and is formed around both the end 8 and the inner wall regions 21 of the molding strip.

It should be apparent that the concept of the invention is also applicable with other cross-sectional shapes of the molding strip 1. The form and shape of the end pieces 3 is also a matter of choice.

Although the present invention has been described in connection with preferred embodiments thereof, many variations and modifications will now become apparent to those skilled in the art. It is preferred, therefore, that the present invention be limited not be the specific disclosure herein, but only by the appended claims.

What is claimed is:

1. A method of forming an end piece on an end face of a hollow molding strip wherein the strip has a longitudinally extending, open ended, hollow chamber within the strip;

the strip having an end region extending longitudinally back from the end face, a longitudinally extending bottom region which is cut out to define a longitudinally extending cut out region, and a top region which extends longitudinally over the cut out region and together with the bottom region defines the hollow chamber;

the method comprising positioning the end region of the molding strip in an injection mold having a molding cavity, placing a capping element in the molding cavity for the capping element to extend through the cut out region of the bottom region of the strip and to extend toward the top region of the strip, so that the top region of the strip protrudes over the capping element;

the injection mold comprising bottom and top halves and the method further comprising closing the top half of the mold over the strip for pressing the top region of the strip against the capping element, said top region protruding over the capping element, whereby the capping element seals the end region and the hollow chamber of the molding strip; and injecting molding compound into the mold cavity on the side of the capping element which faces out of the hollow chamber to form the end piece.

2. The method of claim 1, further including the step of separating the top and bottom mold halves and lifting the strip off the bottom mold half to disengage it from the capping element.

3. The method of claim 2 in which the strip is a plastic strip.

* * * * *